(12) United States Patent
Andersen

(10) Patent No.: US 8,397,903 B2
(45) Date of Patent: Mar. 19, 2013

(54) MODULAR BELT CONVEYOR, IN PARTICULAR A CURVING OR HELICAL CONVEYOR

(75) Inventor: Kenneth Westergaard Andersen, Vejle (DK)

(73) Assignee: Ammeraal Beltech Modular A/S, Vejle (DK)

( * ) Notice: Subject to any disclaimer, the term of this patent is extended or adjusted under 35 U.S.C. 154(b) by 181 days.

(21) Appl. No.: 12/804,093

(22) Filed: Jul. 13, 2010

(65) Prior Publication Data

US 2011/0017576 A1  Jan. 27, 2011

(30) Foreign Application Priority Data

Jul. 13, 2009 (DK) .................................. 2009 00858

(51) Int. Cl.
*B65G 17/08* (2006.01)

(52) U.S. Cl. ........ 198/778; 198/850; 198/851; 198/852; 198/853; 198/831

(58) Field of Classification Search .................. 198/778, 198/831, 850–853
See application file for complete search history.

(56) References Cited

U.S. PATENT DOCUMENTS

| | | | |
|---|---|---|---|
| 4,276,980 A * | 7/1981 | Oizumi ......................... | 198/851 |
| 4,901,844 A * | 2/1990 | Palmaer et al. ................ | 198/778 |
| 5,280,833 A | 1/1994 | Robin | |
| 5,372,248 A * | 12/1994 | Horton .......................... | 198/852 |
| 5,419,428 A * | 5/1995 | Palmaer et al. ................ | 198/831 |
| 5,431,275 A * | 7/1995 | Faulkner ........................ | 198/853 |
| 6,471,048 B1 * | 10/2002 | Thompson et al. ........... | 198/853 |
| 6,837,367 B1 * | 1/2005 | Klein et al. .................... | 198/853 |
| 7,073,662 B2 * | 7/2006 | Neely et al. .................... | 198/850 |
| 7,228,959 B1 * | 6/2007 | Harrison ........................ | 198/852 |
| 7,281,626 B2 * | 10/2007 | Guldenfels ..................... | 198/852 |
| 7,624,858 B2 * | 12/2009 | Delair et al. ................... | 198/778 |
| 7,699,160 B2 * | 4/2010 | Marsetti ......................... | 198/853 |

* cited by examiner

*Primary Examiner* — Douglas Hess
(74) *Attorney, Agent, or Firm* — James Creighton Wray

(57) ABSTRACT

A modular belt conveyor (12), in particular curving or helical conveyor, including a number of mutually interconnected modular belt conveyor links (14) that together form a common curving or helical conveyor with an inner and outer belt edge, respectively, of which at least one belt edge, preferably the inner belt edge, interacts by inter-spaced, preferably vertical curve guides, wherein at the belt edge or edges interacting with the curve guide, each of the belt conveyor links (14) are either provided with an edge reinforcement or are fitted with an edge element (20), the edge reinforcement or edge element (20), respectively, together with the corresponding adjacent belt conveyor link (14) forming a substantially closed guide surface (34) at the belt edge in question. In a simple way and by means of simple technical means are hereby achieved the possibility of counteracting the said problems of lateral incisions or apertures at the inner or outer belt edge.

7 Claims, 3 Drawing Sheets

MODULAR BELT CONVEYOR, IN PARTICULAR A CURVING OR HELICAL CONVEYOR

This application claims the benefit of Danish Application No. PA 2009 00858 filed Jul. 13, 2009, which is hereby incorporated by reference in its entirety as if fully set forth herein.

FIELD OF THE INVENTION

The present invention concerns a modular belt conveyor, in particular a curving or helical conveyor, of the kind indicated in the preamble of claim 1.

BACKGROUND OF THE INVENTION

By existing plastic belt conveyors which have a laterally curving course, lateral incisions or apertures appear at the inner and outer belt edges, as seen from above.

Such lateral incisions or apertures may particularly cause problems by modernising existing curving or helical conveyors where e.g. it is desired to replace outmoded and noisy metal conveyor belts with modern and quiet modular belt conveyors of plastic.

OBJECT OF THE INVENTION

On that background, it is the object of the invention to indicate an improved modular belt conveyor which in a simple way and by means of simple technical means may counteract the above mentioned problems with lateral incisions or apertures at the inner or outer belt edge.

DESCRIPTION OF THE INVENTION

The modular belt conveyor according to the invention is characterised in that at the belt edge or edges interacting with the curve guide, each of the belt conveyor links are either provided with an edge reinforcement or are fitted with an edge element, the edge reinforcements or edge elements, respectively, together forming a substantially closed guide surface at the belt edge in question. In a simple way and by means of simple technical means are hereby achieved the possibility of counteracting the said problems of lateral incisions or apertures at the inner or outer belt edge.

By establishing a predominantly closed inner guide surface, by means of the invention it becomes possible e.g. in existing helical conveyors to replace outmoded noisy steel belt conveyors with modern modular plastic belt conveyors without necessitating the very heavy costs of substituting current curve guides along the inner side of an existing helical conveyor where the curve guides e.g. consists of mutually separate vertical curve guides in the form of inwardly pointed angle irons which also form part of the supporting structure.

By replacing conveyor belts of steel with modern modular conveyor belts of plastic, it will also be possible to eliminate the need for lubrication of the plant to a very large extent such that an improvement is also achieved with regard to contamination by using conveyor belts of plastic.

The modular belt conveyor according to the invention is suitably designed such that the edge elements are designed with engagement means which are adapted to be passed down over and grip firmly around an outer link part of the belt conveyor link. Hereby is achieved that it becomes easier to mount the extra edge elements which are primarily mounted on the active guiding outer side of the curving or helical conveyor.

With the intention of establishing the predominantly closed guide surface, the modular belt conveyor according to the invention is designed such that the edge elements at the front and rear outer sides are designed with projecting parts that project in under and across, respectively, complementary projecting parts of corresponding edge elements mounted on the adjacent belt conveyor link.

The modular belt conveyor according to the invention is preferably designed such that the engagement means include a downwardly open, semicircular cutout in an inner side of the edge element, the cutout adapted to surround a connecting axis between the belt conveyor links.

Moreover, the modular belt conveyor according to the invention is preferably designed such that the engagement means include lower inwardly projecting edge parts adapted to gripping at an underside edge of the outer link part of the belt conveyor link.

With the object of enabling mounting at both side edges of the modular belt conveyor according to the invention, the said edge element is provided as two mutually laterally reversed designs for mounting at opposing outer guide side edges of each belt conveyor link.

With the intention of achieving improved strength, the modular belt conveyor according to is suitably designed such that the edge elements constitute a separate wearing part which is made by injection moulding of a suitable plastic material containing a suitable reinforcement material, e.g. Kevlar and/or carbon fibres.

Alternatively, the modular belt conveyor according to the invention may be designed such that the edge reinforcements are formed by making the belt conveyor link, where the edge reinforcements are established by inserting separate wearing parts in the mould for simultaneously establishing an outer, predominantly closed guide surface of the active outer guide edge of the individual belt conveyor links.

DESCRIPTION OF THE DRAWING

The invention is explained in more detail in the following in connection with the drawing, on which.

DESCRIPTION OF EXAMPLE EMBODIMENTS

Figure 1:
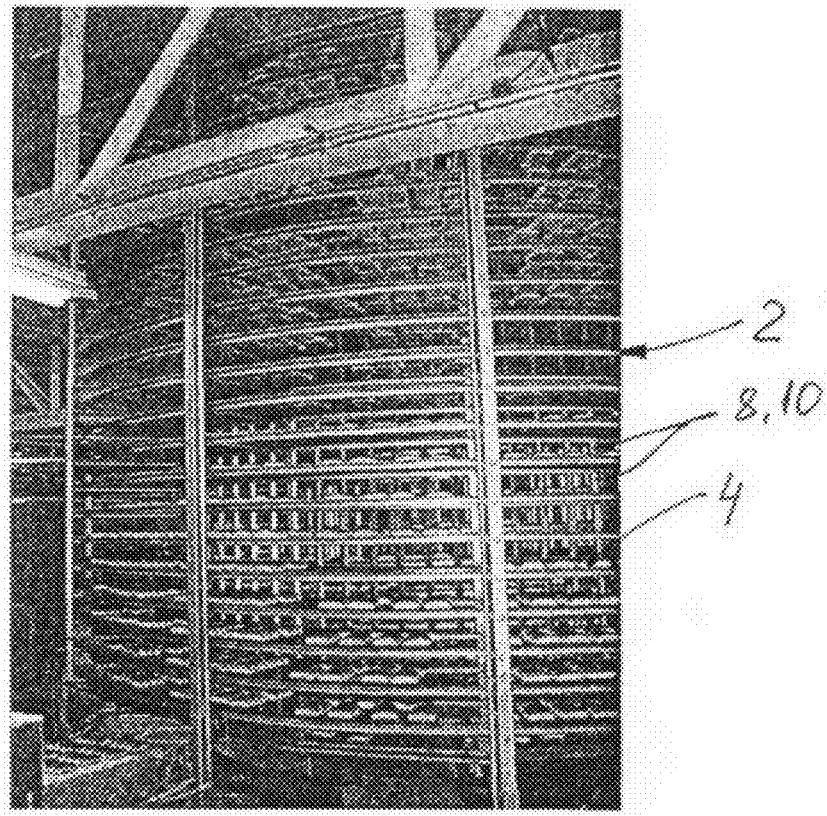
FIG. 1 shows a perspective view of a prior art helical conveyor.
Figure 2:
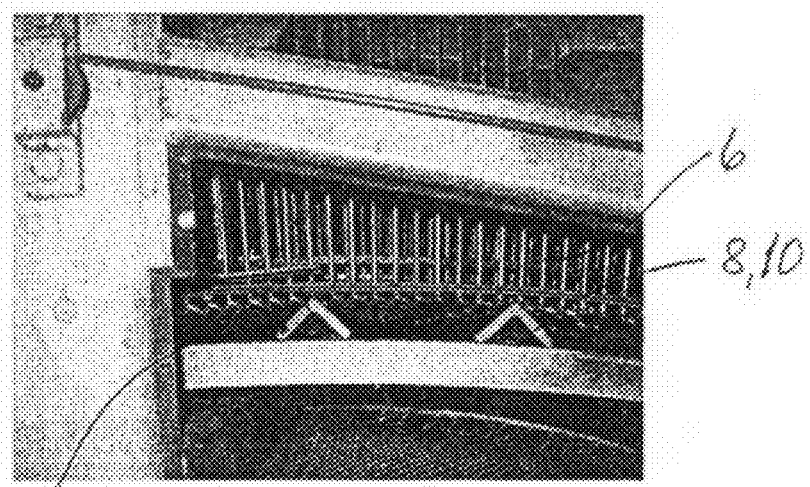
FIG. 2 shows a detail in perspective view of the helical conveyor shown in FIG. 1.

FIGS. 1 and 2 show a large prior art helical conveyor 2 with a belt conveyor 4 which consists of metal lamellae 6 which along a helical inner side edge bear against inwardly sharp edges of vertical curve guides 8 which consist of vertical angle irons 10 which also form part of the supporting structure of the helical conveyor 2.

Figure 3:
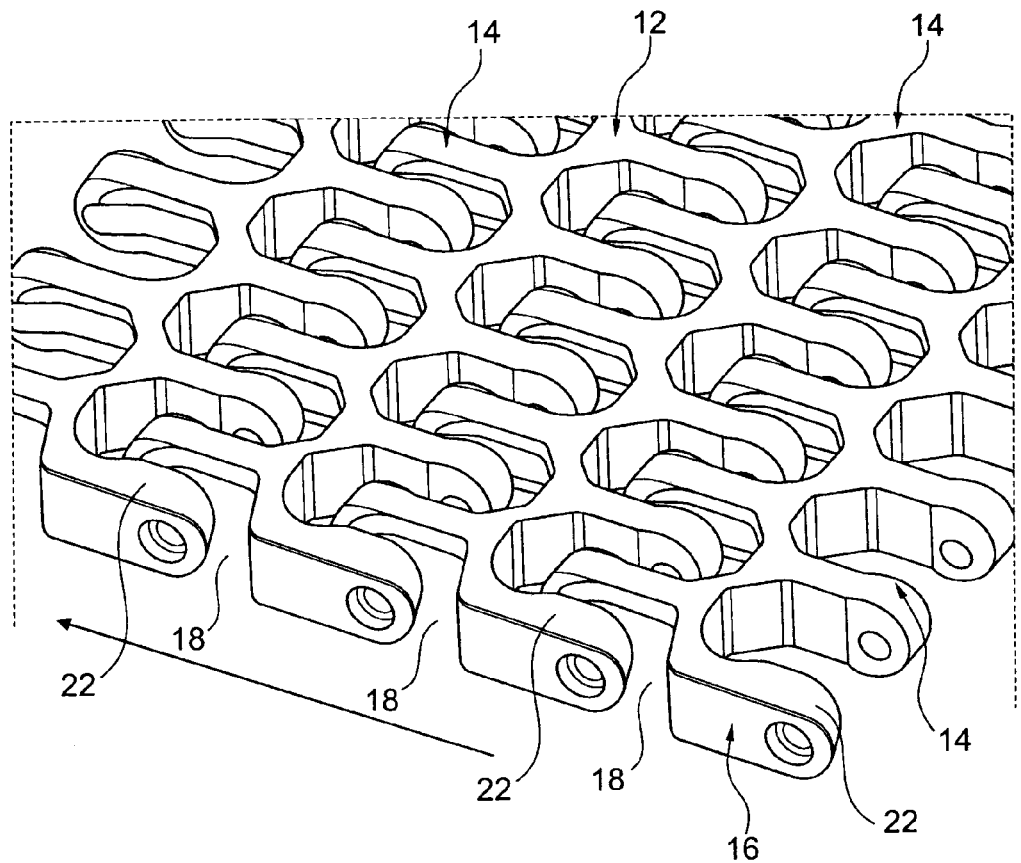
FIG. 3 shows a perspective view of an embodiment of a belt conveyor for use in modular belt conveyor according to the invention.

FIG. 3 shows a belt conveyor 12 consisting of a large number of pivotably interconnected belt conveyor links 14. Along an inner guide edge 16, distinct lateral apertures 18 are formed which may cause problems if the belt conveyor 12 is e.g. to be used for replacing the belt conveyor 2, as the sharp edges of the vertical curve guides 8 will inevitably interfere with the lateral apertures 18 of the belt conveyor 12.

Figure 4:
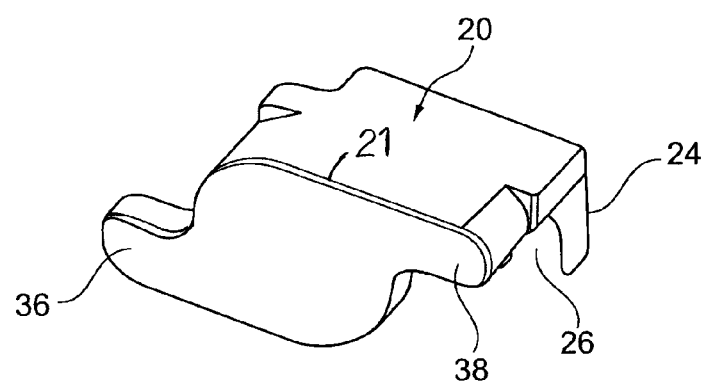
FIG. 4 shows a perspective view of an embodiment of an edge element for use by a modular belt conveyor according to the invention as seen from above.
Figure 5:
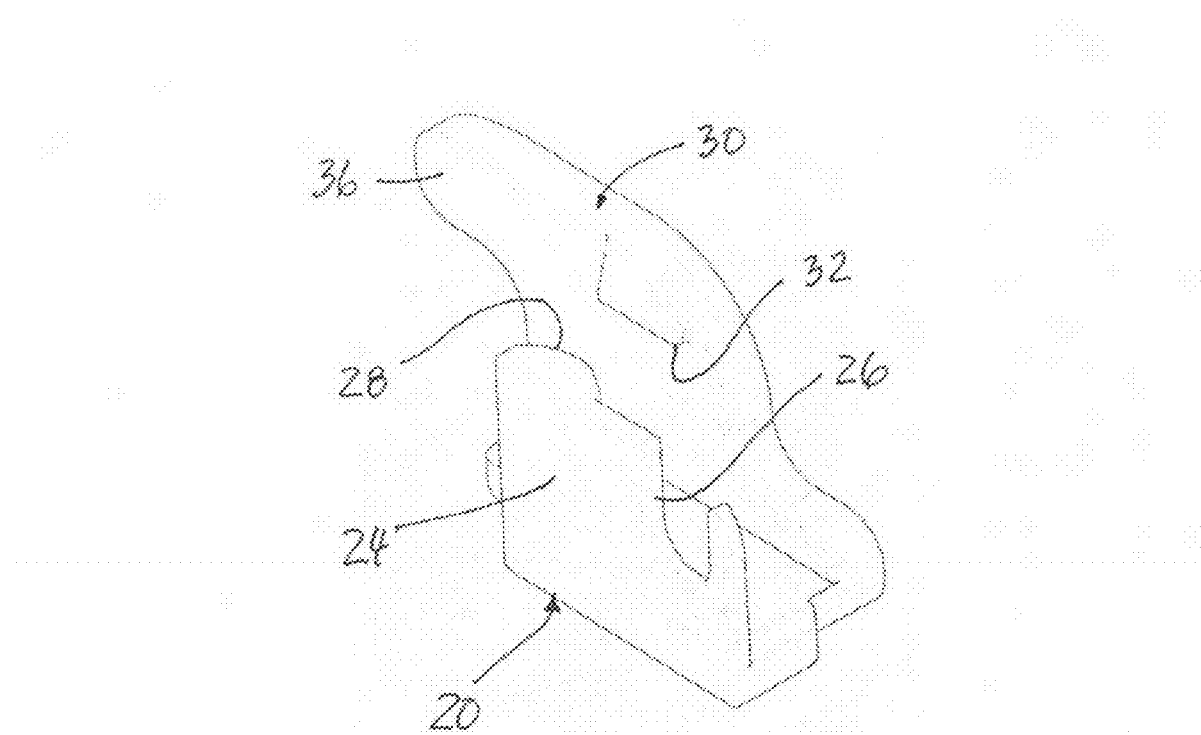
FIG. 5 shows a perspective view of the edge element shown in FIG. 4 for use by a modular belt conveyor according to the invention, as seen from below.
Figure 6:
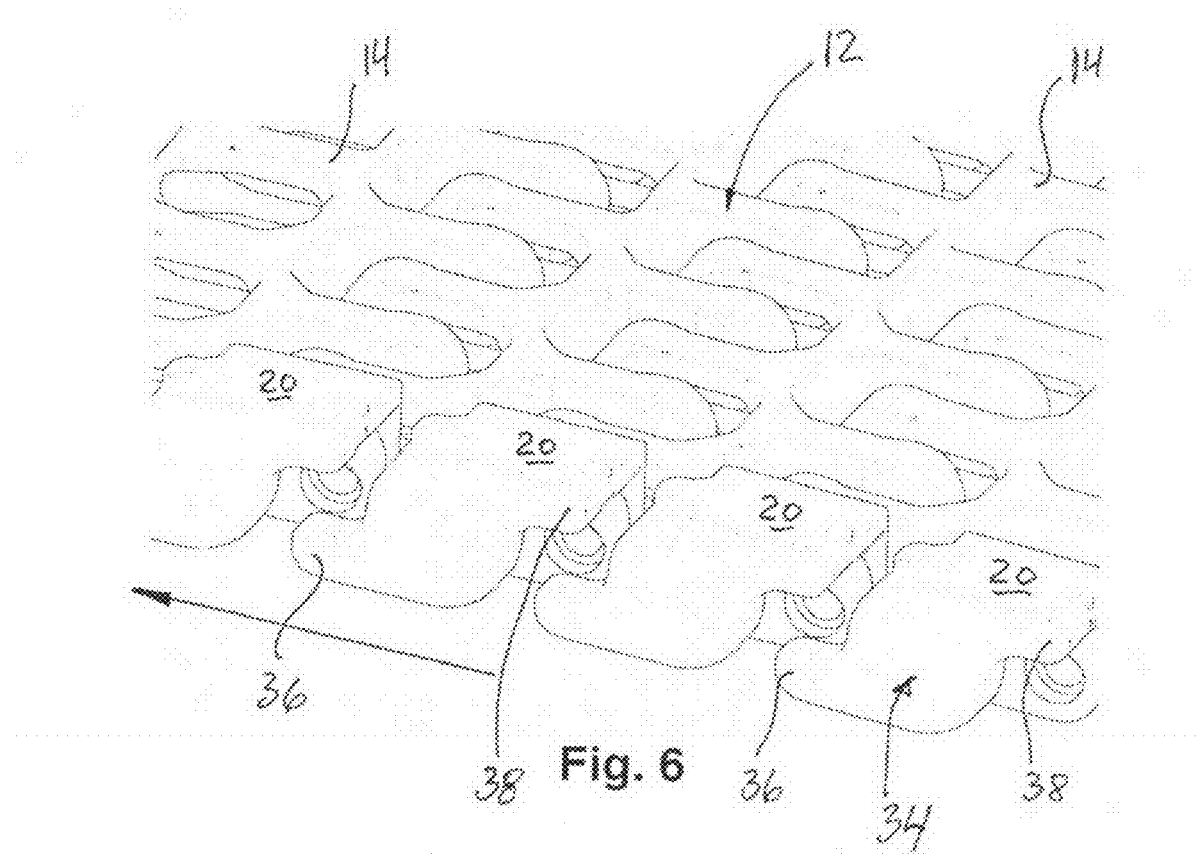
FIG. 6 shows a perspective view of an embodiment of a belt conveyor with fitted edge elements according to the invention.

FIGS. 4 and 5 show an edge element 20 which as shown in FIG. 5 is adapted for mounting on internal outer parts 22 of the belt conveyor links 14 (FIG. 3), as an inner side part 24 of the edge element 20 (FIG. 5) is designed with a downwardly open, semi-circular cutout 26 and a lower inwardly projecting edge part 28.

An outer side part 30 of the edge element 20 is provided opposite the edge part 28 with an inwardly projecting lock part 32 which, like the edge part, is adapted to grip at the underside the outer part 22, when the edge element 20 is pressed down over the outer part 22, where the cutout 26 is adapted to be disposed opposite not shown link axles of the belt conveyor 12.

The edge element 20 together form an outwardly predominantly closed guide surface 34 as the edge elements 20 at the front, i.e. in the direction of movement, has a lower forward projecting part 36 and at the rear a upper rearward projecting part 38 such that, as seen from above, a predominantly closed guide surface 34 is formed, which e.g. will prevent the sharp edges of the vertical curve guides 8 from interfering with the lateral apertures 18 which are now well out of the way behind the edge elements 20.

Each edge element constitutes a separate wearing part 21 which is made by a suitable plastic material containing a suitable reinforcement material, Kevlar and/or carbon fibres.

The edge reinforcement 21 is formed by making the belt conveyor link, where the edge reinforcements are established by inserting separate wearing parts when in a mould for simultaneously establishing an outer, predominantly closed guide surface of the active outer guide edge of the individual belt conveyor links.

The invention claimed is:

1. A modular belt conveyor (12), in particular curving or helical conveyor, including a number of mutually interconnected modular belt conveyor links (14) that together form a common curving or helical conveyor with an inner and outer belt edge, respectively, of which at least one belt edge, preferably the inner belt edge, interacts by inter-spaced, preferably vertical curve guides, characterised in that at the belt edge or edges interacting with the curve guide, each of the belt conveyor links (14) are either provided with an edge reinforcement or are fitted with an edge element (20), respectively, such that the edge reinforcements or edge elements at the front and rear outer sides are designed with projecting parts, said parts project in the intended travelling direction and/or in the opposite direction of the intended travelling direction of the modular conveyor, such that the projecting parts project in under and across, respectively, complementary projecting parts of corresponding edge reinforcements or edge elements mounted on adjacent belt conveyor links, such that together with the corresponding adjacent belt conveyor link (14) a substantially closed guide surface (34) at the belt edge in question is formed.

2. Modular belt conveyor according to claim 1, wherein the edge element is designed with engagement means which are adapted to be passed down over and grip firmly around an outer link part of the belt conveyor link.

3. Modular belt conveyor according to claim 2, wherein the engagement means include a downwardly open, semicircular cutout in an inner side of the edge element, the cutout adapted to surround a connecting axis between the belt conveyor links.

4. Modular belt conveyor according to claim 2, wherein the engagement means include lower inwardly projecting edge parts adapted for gripping at an underside edge of the outer link part of the belt conveyor link.

5. Modular belt conveyor according to claim 1, wherein the edge element is provided as two laterally reversed designs for mounting at opposing outer guide side edges of each belt conveyor link.

6. Modular belt conveyor according to claim 1, wherein each edge element constitutes a separate wearing part which is made by a suitable plastic material containing a suitable reinforcement material, Kevlar and/or carbon fibres.

7. Modular belt conveyor according to claim 1, wherein the edge reinforcement is formed by making the belt conveyor link, where the edge reinforcements are established by inserting separate wearing parts when in a mould for simultaneously establishing an outer, predominantly closed guide surface of the active outer guide edge of the individual belt conveyor links.

\* \* \* \* \*